United States Patent [19]

Kellie

[11] 4,244,633
[45] Jan. 13, 1981

[54] MULTICOLOR HOLOGRAM AND METHOD FOR FORMING SAME

[75] Inventor: Truman F. Kellie, Lakeland, Minn.

[73] Assignee: Minnesota Mining and Manufacturing Company, Saint Paul, Minn.

[21] Appl. No.: 908,978

[22] Filed: May 22, 1978

[51] Int. Cl.³ .............................................. G03H 1/02
[52] U.S. Cl. ................................. 350/3.78; 350/3.61; 350/320; 430/1
[58] Field of Search ...................... 96/27 H, 36, 38.3; 156/643, 659.1; 350/3.61, 3.67, 3.75, 3.77, 3.78, 3.81, 3.84, 162 R, 320; 430/1, 2

[56] References Cited

U.S. PATENT DOCUMENTS

| | | | |
|---|---|---|---|
| 3,532,406 | 10/1970 | Hartman | 350/3.85 |
| 3,567,305 | 3/1971 | Collier et al. | 350/3.68 |
| 3,627,400 | 12/1971 | Caulfield | 350/3.73 |
| 3,669,673 | 6/1972 | Ih et al. | 96/38.3 |
| 3,674,331 | 7/1972 | Caulfield | 350/3.78 |
| 3,731,994 | 5/1973 | Wick et al. | 350/3.61 X |
| 3,743,507 | 7/1973 | Ih et al. | 96/81 |
| 3,758,649 | 9/1973 | Frattarola | 264/1 |
| 3,777,633 | 12/1973 | Kirk | 96/35.1 |
| 3,917,378 | 11/1975 | Gale | 350/3.77 |
| 4,071,291 | 1/1978 | Suzuki et al. | 350/3.80 |
| 4,094,575 | 6/1978 | Kellie | 350/3.67 |

OTHER PUBLICATIONS

Pennington et al., "Multicolor Wavefront Reconstruction", *Applied Phys. Ltrs.*, vol. 7, No. 3, Aug. 1965, pp. 56–57.
Upatnieks et al., "Color Holograms For White Light Reconstruction", *Appl. Phys. Ltrs.*, vol. 8, No. 11, Jun. 1966, pp. 286–287.
Friesem et al., "Multicolor Wavefront Reconstruction", *Applied Optics*, vol. 6, No. 3, Mar. 1967, pp. 529–536.
Collier et al., "Multicolor Imaging From Holograms Formed on Two-Dimensional Media", *Applied Optics*, vol. 6, No. 6, Jun. 1967, pp. 1091–1095.
Lin et al., "Experimental Techniques in Making Multicolor White Light Reconstructed Holograms", *Appl. Optics*, vol. 6, No. 7, Jul. 1967, pp. 1255–1258.
Leith, "White-Light Holograms", *Scientific American*, vol. 235, No. 4, Oct. 1976, pp. 80–93.
Okoshi, "6. Holography", *Three—Dimensional Imaging Techniques*, 1976, pp. 262–271.

*Primary Examiner*—John K. Corbin
*Assistant Examiner*—John D. Lee
*Attorney, Agent, or Firm*—Cruzan Alexander; Donald M. Sell; William B. Barte

[57] ABSTRACT

A hologram capable of reconstructing a multicolor three-dimensional image is formed in which a plurality of standing wave interference fringe patterns corresponding to primary color components of a multicolored object are spatially multiplexed as a relief pattern on a surface of the hologram. A permanent optical density image of the spatially multiplexed fringe patterns is first formed on a panchromatic photographic plate. The plate is overcoated with a photoresist layer, back-exposed to contact-print the optical densit image onto the photoresist layer, after which the layer is processed to form the surface relief pattern.

12 Claims, 9 Drawing Figures

MULTICOLOR HOLOGRAM AND METHOD FOR FORMING SAME

BACKGROUND OF THE INVENTION (1) Field of the Invention

This invention relates to holography, and in particular to holograms and processes for forming holograms which are capable of reconstructing three-dimensional multicolor images.

(2) Description of the Prior Art

A major desirable aspect of holograms is that a true three-dimensional image may be reconstructed therefrom. Typically, focused image holograms are formed by directing a beam of coherent radiation such as from a laser through a beam splitter to form two beams, one of which is used as a reference beam and the other of which is directed onto an object. An object beam formed from the coherent light reflected from (or passed through) the object, is then directed at one angle onto a suitable recording medium, while the reference beam is directed onto the medium from another direction to interfere with the object beam and thereby form in the medium a diffraction pattern or hologram corresponding to the object. While such a hologram may be reconstructed to enable viewing the image in three dimensions, a well-resolved, reconstructed image generally tends toward monochromaticity.

A number of techniques have been proposed for enabling the reconstruction of a three-dimensional multicolor image. In one such technique, holographic diffraction patterns prepared by coherent light of three primary colors are superimposed, or multiplexed, onto a panchromatic medium. While such a technique enables a three-dimensional multicolor image to be seen, a number of undesirable ghost images are formed. To minimize cross-talk resulting in such ghost images, volume holograms containing superimposed diffraction patterns corresponding to each of the primary colors have been formed in a thick emulsion. See, for example, that set forth in U.S. Pat. No. 3,532,406 (Hartman). Such volume holograms have been noted to possess several disadvantages:

(1) the thick emulsions generally shrink during development and thus changes the spacing between the fringes, and hence of the reproduced colors; and (2) the presence of overlapping reference beams results in the presence of beat frequencies and ghost images.

Subsequent such developments, Friesem et al, "Multicolor Wavefront Reconstruction", Appl. Optics. Vol. 6, No. 3, pp. 529-536 (Mar. 1967), disclosed that such problems in volume holograms could be further minimized. In the work there reported, the angle between the reference and object beam was greater than 100°, the useful coherence length of the radiation was as long as possible and effects of vibrations, film transfer characteristics and film shrinkage were minimized.

In order to further avoid ghost images in multicolor holograms, multicolor holograms have been formed in two-dimensional planar media using a spatial multiplexing technique in which the interference fringe patterns corresponding to each color are recorded on different groups of small areas dispersed over the photographic medium. See U.S. Pat. No. 3,567,305 (Collier et al). In one technique there disclosed, an aperture mask consisting of thin stripes of alternating transparent and opaque areas is placed over a photographic medium and a first pair of beams including a reference beam and an object beam corresponding to one color of the object are directed onto the mask such that a first group of small areas or stripes are exposed. The position of the mask is changed and a second pair of beams corresponding to a second color are directed onto a previously unexposed second group of small areas or stripes. Alternatively, that patent indicates that a filter mask having a plurality of parallel stripes, any one of which is capable of transmitting only one of the primary colors, red, green or blue, may be placed in contact with the medium and light from three pairs of coherent beams corresponding to each color directed thereat. The stripes are said to be arranged so that each of the colors is distributed uniformly throughout the mask. On reconstruction, the colors of the illuminating light are then also controlled such that light of any given color illuminates only that portion of the hologram which had been formed with the same color, such as by placing the same mask used in forming the hologram in register over the hologram. The suggested color mask, while being a "simple concept" does not permit the formation of multicolor holograms enabling sufficient color separation, particularly between the green and blue, and does not enable inexpensive duplication thereof.

A similar embodiment is disclosed in U.S. Pat. No. 4,071,291 (Suzuki et al). In that patent, a striped aperture mask, in which the relative width of the stripes is particularly specified, is shifted in position to form a multicolor hologram. Reconstruction is effected by passing light from three separate light sources of appropriate color through separate masks similar to that used to form the hologram.

A technique for making high-fidelity, phase filters in which optical density images in a previously recorded and developed photoemulsion are converted to a relief image in a developed photopolymer layer is disclosed in U.S. Pat. No. 3,777,633 (Kirk). That patent does not suggest the use of such a technique for providing holograms capable of reconstructing multicolor images.

SUMMARY OF THE INVENTION

The present invention is directed to a method for providing an article somewhat similar to that disclosed by Collier et al, i.e., one suitable for the holographic reconstruction of a three-dimensional multicolor image of an original, three-dimensional, multicolored object, but in which inexpensive replicas are provided and in which superior color balance is achieved. The article of the present invention comprises a substantially homogeneous polymeric sheet which has formed on a surface thereof an optically detectable surface relief pattern including a reseau containing a plurality of standing wave interference fringe patterns, each of which corresponds to a given color component of the original object. The reseau pattern is the result of the breaking up of each of the fringe patterns into a plurality of sections, each of which is spatially adjacent at least one section of all of the other fringe patterns. Such a construction enables the reconstruction of a three-dimensional multicolor image of the object by directing white light through a multicolor mask and onto the article, wherein the mask is positioned in registration with the article such that a given color in the mask is adjacent sections of the hologram corresponding to that color.

The method for forming such an article includes the use of masks in a manner somewhat analogous to that disclosed in U.S. Pat. Nos. 3,567,305 (Collier et al), and 4,071,291 (Suzuki et al). In such a method, a first pair of mutually coherent beams including a reference beam and an object beam having information corresponding to a first color component of a three-dimensional multicolored object modulated thereon are directed against a first group of small areas distributed along a surface of a photographic medium to form a latent image of a first standing wave interference fringe pattern corresponding to the first color component. At least one additional pair of mutually coherent beams including a reference beam and an object beam having information corresponding to an additional color component of said object modulated thereon is directed against a second group of small areas distributed along the medium, which second group of areas is displaced from and distinct from the first group, to form a latent image of a second standing wave interference fringe pattern corresponding to the additional color component.

The latent images are then converted by processing the medium to form a hologram which includes a permanent image of the fringe patterns as regions of varying optical density. The processed medium is next coated with a layer of a positive photoresist. Preferably, so as to avoid degrading the image on the processed medium by softening the developed emulsion during development of the photoresist, a transparent moisture barrier may first be coated onto the medium. The photoresist layer is next exposed to provide in the photoresist layer a latent image of the optically dense permanent image. Preferably, the UV source is directed toward the back surface of the photographic medium such that the optically dense image is contact-printed in the photoresist layer. Finally, the photoresist layer is processed to provide the surface relief hologram described above. Desirably, the surface relief pattern may be used to form a master which may be pressed into the surface of polymeric sheets to provide inexpensive replicas of the holograms.

In a preferred embodiment, a first pair of mutually coherent beams including a reference beam and an object beam having information corresponding to a first color component of the three-dimensional multicolored object modulated thereon are directed against a first group of small areas onto an image plane to form thereat a high contrast standing wave interference fringe pattern of that color component of the object. A first mask having a regular array of alternating opaque and transmissive portions extending thereover is positioned proximate the image plane and over the photographic medium to enable only such portions of the fringe pattern as impinge on the transmissive portions of the mask to pass therethrough. A latent image of the fringe pattern corresponding to the first color component is thus formed.

The first mask is then removed and a second mask is positioned in lieu thereof and in registration with the former location of the first mask. The second mask has a similar array of alternating opaque and transmissive portions extending thereover, which are substantially opposite to those of the first mask, such that light previously blocked by the opaque portions of the first mask is able to pass through the transmissive portions of the second mask. An additional pair of mutually coherent beams including a reference beam and object beam of substantially the same intensity and having information corresponding to a second color component of the object are then directed onto the image plane to form in the photographic medium a latent image of a second interference fringe pattern corresponding to the second color component, which latent image is interlaced with the first latent image.

The separate masks used in the formation of the article of the present invention and the mask utilized in the white light reconstruction of the image of the original multicolored object are desirably provided as follows: A master multicolor transparency mask such as is commercially available as a Dufay screen having alternating squares, hexagons or narrow strips of red, green and blue areas is selected. Due to the stronger attenuation of blue light, it is desirable to provide a master mask having more blue areas than red or green areas. Such a master mask is then imaged through appropriate color filters or with appropriate wavelength light, onto three pieces of panchromatic medium, each of which is positioned in the same relative registration, to provide three separation masks. The multicolor mask used in reconstruction is desirably similarly formed by imaging the master mask onto a similarly registered color transparency film, using a color corrected white light source.

DESCRIPTION OF THE PREFERRED EMBODIMENTS

Figure 1A:
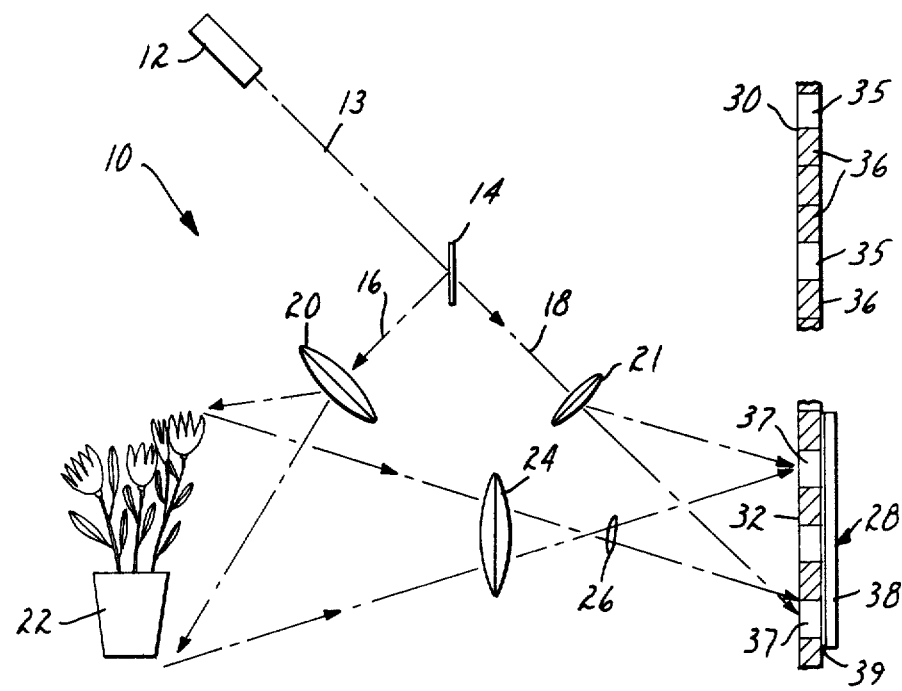
FIGS. 1A and 1B are diagrams which in combination show apparatus for the production of a three-dimensional multicolor hologram according to the present invention.
Figure 1B:
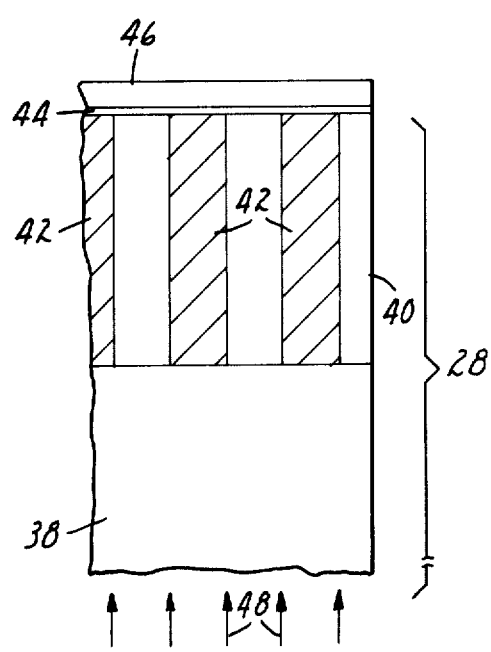

FIGS. 1A and 1B show an illustrative embodiment of the present invention whereby there is formed a surface relief hologram capable of reconstructing a multicolor three-dimensional image. In the apparatus of FIG. 1A, a three color recording of a multicolored object is made on a two-dimensional photographic medium by projecting beams of red, green and blue coherent light through appropriate masks so that each of the three beams impinges on separate areas of the photographic medium. As shown in FIG. 1A, the apparatus 10 comprises three sources of coherent light shown generally as element 12, for producing beams of red, green and blue light. Thus, for example, the element 12 may first be considered as a He-Ne laser for producing a beam of red coherent light. In subsequent steps, the He-Ne laser may be replaced with an Ar+ gas laser, which when suitably filtered will provide green and blue coherent beams. Similarly, the various lasers may be suitably positioned and beams of light therefrom directed along path 13 by an arrangement of mirrors.

Light from the element 12 is directed through a partially transparent mirror 14 which reflects a portion of the light along path 16 while the remainder of the light is directed along path 18. Reflected light directed along path 16 passes through an objective lens 20 such that a three-dimensional multicolored object 22 is substantially uniformly illuminated. Light diffusely reflected from the object 22 passes through a focusing lens 24 to form an object beam 26 which is directed onto an image plane at which is positioned a panchromatic photographic medium 28. The transmitted light along path 18 forms a reference beam which is directed through a focusing lens 21 and onto the photographic medium 28 where it interferes with the object beam 26 to form a latent image of a standing wave interference fringe pattern. A particularly desirable photographic medium 28 comprises a glass plate 38 having coated thereon a nine micrometer thick panchromatic gelatin emulsion 39 such as Kodak Type 131.

Spatial multiplexing of a plurality of standing wave interference fringe patterns corresponding to each primary color component of the multicolored object 22 is preferably effected by providing a set of aperture masks 30, 32 and 34, each of which is selectively positioned adjacent the photographic medium 28 when light of an appropriate color from element 12 is directed onto the object 22. Each aperture mask thus allows light of the respective color to impinge on separate areas of the medium 28. The manner in which the masks 30, 32 and 34 are formed will be discussed in more detail hereinafter. Each mask, such as the mask 30, may be considered as having an array of transparent sections, such as stripes 35, periodically distributed between opaque bands 36. The transparent sections of each mask have opaque counterparts in the masks corresponding to the other two colors, when all three masks are superimposed in registration. As shown in FIG. 1, the "blue" aperture mask 32 is provided with twice as many transparent sections 37 per unit area as that provided in either the "red" mask 30 (sections 35) or in the "green" mask 34 (sections 33), so that appropriate color balance is obtained. Accurate registration of the aperture masks 30, 32 and 34 adjacent the photographic medium 28 is desirably provided such as by the use of registration pins suitably positioned on a vacuum photographic processing table.

Subsequent the three separate exposures with beams of the three primary colors through the appropriate masks, the photographic medium 28 is removed and processed in a conventional manner. The developed, permanent image of the plurality of standing wave interference fringe patterns is then processed as further shown in FIG. 1B. After development, the developed emulsion 40 will typically be approximately four micrometers thick and will have optical density image portions 42 extending substantially through the entire thickness of the emulsion. A 0.1 micrometer moisture barrier 44 is then coated onto the surface of the developed emulsion 40. Such a barrier layer is preferably a solvent coating of polyvinyl cinnamic acid utilizing a xylene solvent, which is desirably spin-coated onto the emulsion to provide a uniformly thick layer. After the barrier layer is sufficiently dry, a one micrometer thick layer of a photoresist 46 is spin-cast onto the barrier layer 44. A commercial spin-casting apparatus such as Type EC101, manufactured by Headway Research, Inc., Garland, Texas, is preferably used in forming such layers. The photoresist 46 is preferably a Type 1350J photoresist manufactured by the Shipley Company, Newton, Massachusetts. The optical density image 42 is contact-printed onto the photoresist 46 by directing UV radiation 48 through the medium 28 in a conventional manner. Following development of the latent image thus produced in the photoresist layer 46, a surface relief image corresponding to the optical density image 42 is formed, thereby completing the hologram in which a surface relief pattern corresponding to the plurality of interference fringe patterns is provided.

Figure 2:
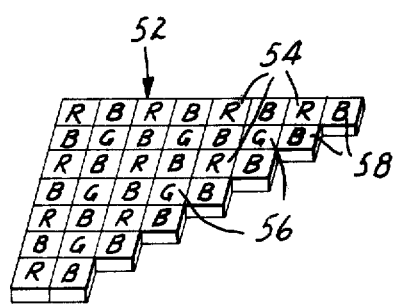
FIG. 2 is a cut-away view of a screen used in one embodiment for forming and reconstructing the hologram of the present invention.

The three-dimensional multicolor holograms of the present invention as well as the multicolor screens utilized in the reconstruction of three-dimensional multicolor images therefrom as discussed hereinafter, are preferably initially derived from a commercially available multicolor screen. Such screens have been used as Dufay type color photography processes, and may typically consist of developed color film containing images of alternating areas of the three primary colors. As shown in FIG. 2, in one embodiment, a multicolored screen 52 may consist of equal sized red, green and blue squares 54, 56 and 58, respectively, each of which is approximately 50 μm ×50 μm (2 mil×2 mil). Due to the low sensitivity of human eyes to blue light and to the excessive amount of red light in conventional white light sources, such screens are typically provided with more blue areas than red or green ones. Accordingly, it will be noted that twice as many blue squares 58 are provided in the master screen of FIG. 2 than red squares 54 or green squares 56.

In one example, a desirable master screen was formed from an original Dufay type transparency, in which each colored square was approximately 16 μm on a side. The original transparency was printed onto Etachrome Brand color transparency manufactured by Kodak Company at 3X enlargement to provide a 4"×5" master screen having 50 μm square colored areas.

Figure 3:
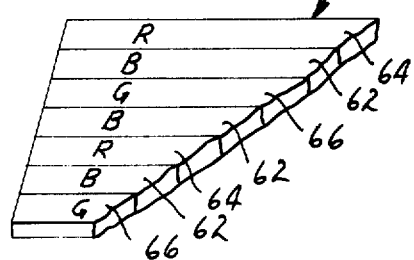
FIG. 3 is a cut-away view of an alternative screen used in forming and reconstructing the hologram of the present invention.

As shown in FIG. 3, in an alternate embodiment, a master screen 60 approximately 4×5 inches (10×13 cm) in size may be provided with a series of narrow stripes of alternating colors. To provide good color balance, the stripes are preferably arranged with each blue stripe 62 sandwiched between a red and green stripe, 64 and 66, respectively, with twice as many blue stripes as red or green ones. Each stripe 62, 64 and 66 is approximately 50 μm wide and extends the width of the screen. Such screens have also been commercially used in Dufay photographic processes, and are believed to be currently utilized in the instant color movie process of Polaroid Corporation. Master screens may also be provided by computer driver laser scanners directed onto suitable orthochromic photographic plates. Appropriately exposed areas of either a two-dimensional or one-dimensional array having varying shaped areas may thus be automatically provided.

Figure 4A:
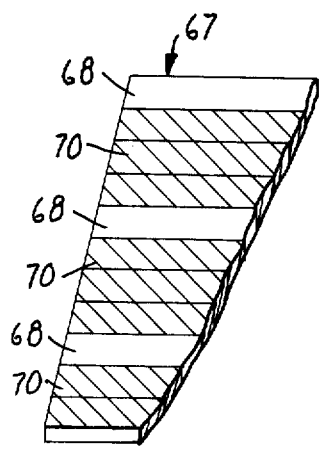
FIGS. 4A, 4B and 4C are cut-away views of a set of separation screens used in the embodiment shown in FIG. 1 for forming holograms according to the present invention.
Figure 4B:
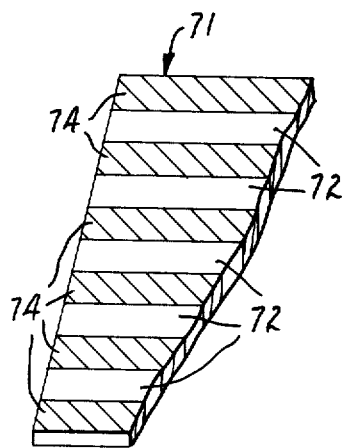

In one embodiment, the master screen 60 containing the array of stripes shown in FIG. 3 was processed to provide three separation positives for use as the aperture masks 30, 32 and 34 shown in FIG. 1A. As shown in more detail in FIGS. 4A–4C, each separation positive corresponds to one color component of the master screen. Such separation positives were desirably formed as follows: The master screen 60 was first placed in contact and in accurate registration with a high resolution photographic plate sensitive to red light, with an interlayer of index matching fluid such as xylene. White light from a conventional tungsten source was directed through a narrow band interference filter such that only red light impinged onto the screen and thence through the red areas of the screen onto the photographic plate. A latent, black and white image was thus formed in the plate corresponding to the red areas of the master screen 60. This latent image was conventionally developed to provide the separation positive 67 used as the aperture mask 30 shown in FIG. 1A. As further shown in FIG. 4A, the positive 67 comprises transparent stripes 68 corresponding to the red stripes 64 of the screen 60 (FIG. 2) separated by opaque bands 70.

Similarly, a second high resolution photographic plate sensitive to blue light was next positioned and in contact in the same accurate registration with the master screen 60 together with an interlayer of xylene. The second plate was similarly exposed through the screen 60 and another narrow bandpass interference filter passing blue light to form a black and white latent image corresponding to the blue areas of the master screen. The second plate was likewise developed to provide a "blue" separate positive 71 used as the "blue" aperture mask 32 of FIG. 1A. As further shown in FIG. 4B, the positive 71 comprises transparent stripes 72 separated by opaque bands 74.

Figure 4C:
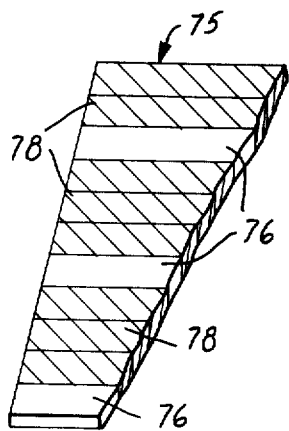

Finally, a third high resolution photographic plate sensitive to green light was positioned in contact and in the same registration as that of the previous plates, with the master screen 60 together with an index matching interlayer of xylene, and was exposed through the screen 60 and a narrow band width interference filter passing green light to provide a black and white latent image corresponding to the green areas of the master screen. This third plate was developed to provide the third separation positive 75 used as the "green" aperture mask 34 of FIG. 1A. As shown in FIG. 4C, the "green" positive 75 comprises transparent stripes 76 separated by opaque bands 78.

Color transparencies for use during reconstruction of images from the hologram articles of the present invention are also desirably made from master screens such as elements 52 and 60 of FIGS. 2 and 3. Such transparencies must have the same color areas as the master screens, in appropriate registration with the respective transparent areas of each of the separation positives corresponding to that color. Accordingly, such transparencies were preferably made by assembling the master screen 60 with high resolution Etachrome Brand transparency film manufactured by Kodak Company together with an index matching fluid such as xylene, exposing the assembly to white light through the screen 60 and conventionally developing the transparency film.

Figure 5:
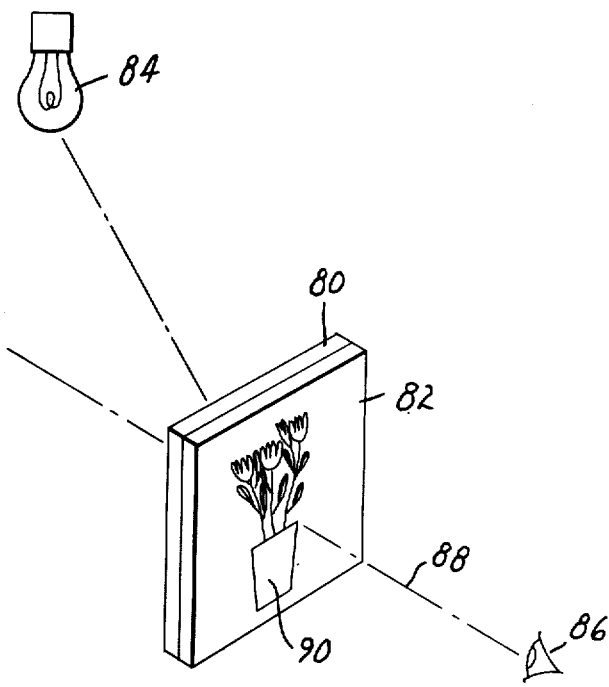
FIG. 5 is a diagram showing the reconstruction of a three-dimensional multicolor image according to the present invention.

The use of such a color transparency during reconstruction of images from the hologram articles of the present invention is further shown in FIG. 5. As is there shown, a color transparency 80 is superimposed in accurate registration with a hologram article 82 such that the colored areas within the transparency 80 are in accurate registration with portions of the hologram 82 which correspond to that color. White light from a conventional source 84 is directed off-axis onto the transparency 80. Light of appropriate colors is filtered out by the transparency, such that light of only a desired color passes through the transparency 80 to illuminate the appropriate portions of the hologram 82. Accordingly, an observer 86 viewing the hologram along the axis 88 will see a reconstructed multicolor three-dimensional image 90 corresponding to the original article 22 shown in FIG. 1A.

Figure 6:
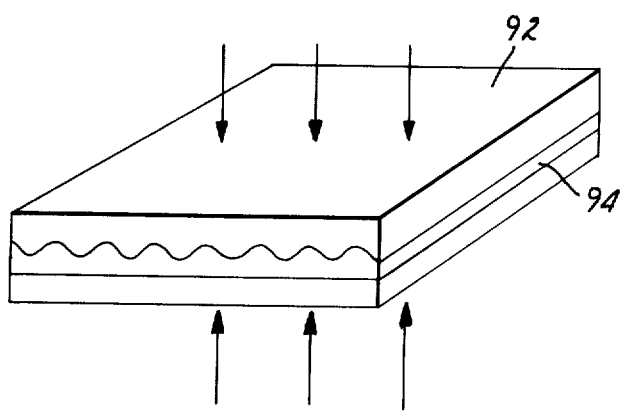
FIG. 6 is a perspective view of an embodiment for producing replicated holograms suitable for reconstructing three-dimensional multicolor images.

FIG. 6 shows a method whereby a surface relief hologram of the present invention has been metallized to form a master hologram 92. According to conventional thermoplastic recording techniques, such a master may be replicated into a conventional thermoplastic copy material 94 by pressing it against the master 92 under suitable heat and pressure conditions. Inexpensive replicates of the surface relief holograms of the present invention are thus readily provided and are readily reconstructed when provided together with inexpensive color transparency masks as described hereinabove.

In the embodiments discussed hereinabove, an aperture mask in direct contact with the panchromatic photographic medium has been utilized in the formation of the holograms of the present invention. It is similarly within the scope of the present invention that a number of other alternative embodiments may likewise be employed. Thus, for example, separate aperture masks corresponding to each desired color may be placed in the path of the incident beams and the thus segmented beams appropriately directed onto different areas of the photographic medium. Likewise, while a set of black and white separation positives are desirably used as aperture masks corresponding to each desired color, a single multicolor aperture mask may similarly be used. For example, many of the various embodiments depicted in U.S. Pat. No. 3,567,305 (Collier et al) may similarly be used. Numerous other embodiments and modifications may likewise be made by those skilled in the art without departing from the spirit and scope of the present invention.

Having thus described the present invention, what is claimed is:

1. A method for forming a surface relief holographic article suitable for the holographic reconstruction of a three-dimensional multicolor image of an original three-dimensional multicolored object, comprising the steps of
    (a) directing a first pair of beams including a mutually coherent reference beam and object beam having information corresponding to one color component of said multicolored three-dimensional object modulated thereon against a first group of small areas distributed along a surface of a photographic medium to form a latent image of a first standing wave interference fringe pattern corresponding to said one color component,
    (b) directing an additional pair of mutually coherent beams including a reference beam and an object beam having information corresponding to an additional color component of said object modulated thereon against a second group of small areas distributed along said medium, which second group of areas is displaced from and distinct from said first group, to form a latent image of a second standing wave interference fringe pattern corresponding to said additional color component,
    (c) processing said medium to form a holographic article which includes a permanent image of said fringe patterns as regions of varying optical density,
    (d) positioning a positive photoresist layer in intimate optical contact with the processed medium.
    (e) directing light through the processed medium and onto the photoresist layer to provide in said layer a latent image of said permanent image, and (f) processing the photoresist layer to provide a said surface relief holographic article which comprises a substantially homogeneous polymeric sheet having formed on a surface thereof an optically detectable relief pattern corresponding to said fringe patterns, whereby a three-dimensional multicolor reconstruction of said object may be obtained by directing white light through a multicolor mask and onto the article, said mask being positioned in registration with the article such that a given color in the mask is adjacent portions of the hologram corresponding to that color.

2. A method according to claim 1, further comprising the steps of using the surface relief pattern as a master and replicating said relief into the surface of plastic sheets to provide inexpensive holographic replicas from which a multicolor three-dimensional reconstructed image may be obtained in like manner to that obtained from said article.

3. A replica according to the method of claim 2.

4. A method according to claim 1, comprising positioning a first apertured mask over the photographic medium to expose only the first area group to light from said first pair of beams, and replacing said first mask with a second apertured mask positioned in registration with the former position of said first mask, said second mask having apertures substantially opposite to those in said first apertured mask to expose only the second area group to said additional pair of beams.

5. A method according to claim 4, further comprising replacing said second mask with a third apertured mask positioned in registration with the former positions of said first and second masks, said third mask having apertures substantially opposite those of said first and second masks such that light previously blocked by the opaque portions of the first and second masks is able to pass through the transmissive portions of the third mask, and directing a third pair of mutually coherent beams including a reference beam and an object beam having information corresponding to a third color component of said object modulated thereon through said third mask and onto said photographic medium to form thereat a latent image of a third standing wave interference fringe pattern corresponding to a third color component of said object.

6. A method according to claim 1, further comprising the steps of providing an apertured mask containing a regular array of thin alternating opaque and transmissive stripes extending the length of the masks, in which the width of each transmissive stripe is not greater than 0.5 mm.

7. A method according to claim 6 in which said providing step comprises providing three masks corresponding to red, green and blue primary colors in which the transmissive portions of each correspond to the opaque portions of the other two masks when the masks are mutually registered.

8. A method according to claim 7 in which said providing step comprises providing a mask corresponding to the blue primary color with twice as many transmissive stripes per unit area as are provided in the masks corresponding to the red and green primary colors.

9. A method according to claim 1, further comprising the steps of providing a mask as a regular two-dimensional array of alternating opaque and transmissive areas extending over the length and breadth of the mask in which the length and height of each transmissive area is not greater than 0.5 mm.

10. A method according to claim 9 in which said providing step comprises providing three masks corresponding to red, green and blue primary colors in which the transmissive portions of each correspond to the opaque portions of the other two masks when the masks are mutually registered.

11. A method according to claim 10 in which said providing step comprises providing a mask corresponding to the blue primary color with twice as many transmissive areas per unit area as are provided in the masks corresponding to the red and green primary colors and in which all of the transmissive areas of the blue mask are spaced to be adjacent to at least one transmissive area of both the green and red masks when all three masks are mutually registered.

12. A holographic article according to the method of claim 1.

* * * * *